United States Patent [19]

Neary

[11] 4,129,956
[45] Dec. 19, 1978

[54] DIVING PLANE FOR FISHING

[75] Inventor: Joseph F. Neary, Novato, Calif.

[73] Assignee: Troller Corporation, Corte Madera, Calif.

[21] Appl. No.: 778,829

[22] Filed: May 17, 1977

[51] Int. Cl.$^2$ .............................................. H01K 95/00
[52] U.S. Cl. .................................................... 43/43.13
[58] Field of Search ................... 43/43.1, 43.12, 43.13, 43/44.9, 44.91, 42.04

[56] References Cited

U.S. PATENT DOCUMENTS

| | | | |
|---|---|---|---|
| 3,583,089 | 6/1971 | Scarbro | 43/43.13 |
| 3,643,370 | 2/1972 | Cools et al. | 43/43.13 |
| 3,813,809 | 6/1974 | Frotiee | 43/43.13 |
| 3,839,813 | 10/1974 | DeSmidt | 43/43.12 |
| 3,897,648 | 8/1975 | Neary | 43/43.13 |
| 3,940,872 | 3/1976 | Weber | 43/43.13 |

*Primary Examiner*—Edward M. Coven
*Attorney, Agent, or Firm*—Townsend and Townsend

[57] ABSTRACT

A diving apparatus is placed in serial connection in a fish line proximate to the trailing and submerged end of the line as the line is used in trolling. The apparatus includes a planar diving platform constructed with a transverse base area at the leading end of the platform having trailing and projecting flukes spaced to form a longitudinally extending and rearwardly opening central slot. A keel is fastened normally to the plane of the platform and depends forwardly of the slot to define a sinker holding surface on which paired, substantially hemispherical weights are fastened on either side thereof. Two normally depending and projecting fins extend normally down from the planar surface of the platform immediately juxtaposed to both sides of the slot. The release member has one portion connected to the leading end of the fish line and a second member connected to the trailing edge of th fish line. This release member clamps medially at an intermediate catch member to a bar spanning the slot and is held by the projecting fins in rigid, side-by-side relation to form an effectively rigid, three-dimensional locked and clamped position. When the platform is being pulled through the water in trolling, it dives and trolls in essentially a vertical plane including the path of the trailing line, this vertical plane being in the wake of towing of the line. Entanglement with adjoining, closely spaced trolling lines is avoided. Provision is made for conventional release from the three-dimensional diving position on occurrence of a strike.

3 Claims, 4 Drawing Figures

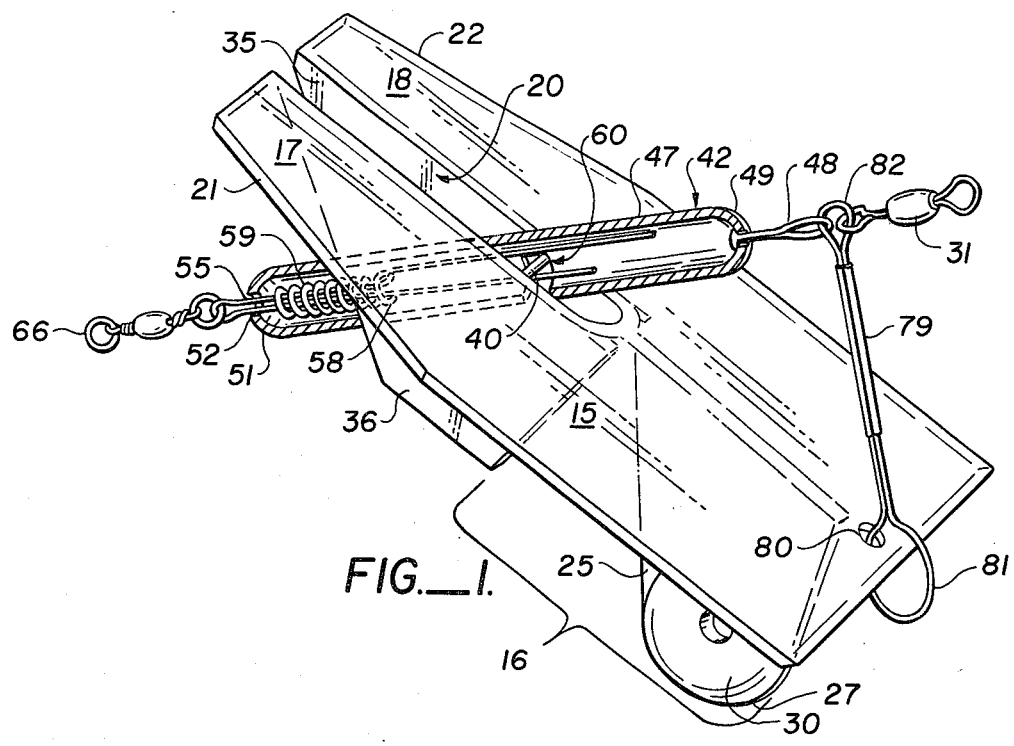
FIG._1.
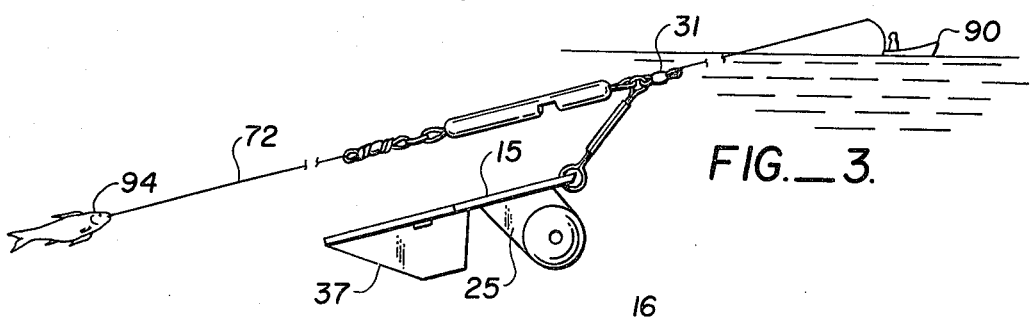
FIG._2.
FIG._3.
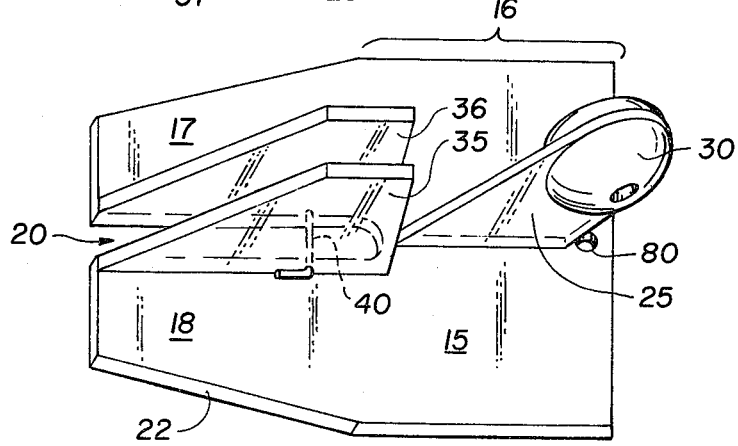
FIG._4.

DIVING PLANE FOR FISHING

This invention relates to diving planes for sinkers and more importantly discloses an improved diving plane capable of non-entanglement with adjoining lines controlled from a vessel having multiple trolling lines.

STATEMENT OF THE PROBLEM

Diving platforms heretofore used in trolling typically do not track the trolling vessel in a straight line. Heretofore, such trolling platforms have had a tendency to introduce a side-to-side wobble as they are towed at various speeds through the water by the vessel. Where multiple lines depend in the wake of a vessel, such side-to-side motion is unacceptable. Entanglement of the lines occurs with lack of transverse stability of the towed platform.

This problem of side-to-side wobble is especially acute in modern "party boat" fishing. In such fishing, multiple amateur fishermen are taken to sea and fish from closely spaced and assigned positions from a party boat. Entanglement problems of diving platforms have led to such platforms being wholly banned on such party boats.

Where platforms are not used, conventional weights must be used to submerge the line. As these weights are lost when a fish strikes and are not recoverable, they are both costly and ofttimes unpredictable in the trolling depth obtained.

STATEMENT OF THE PRIOR ART

In my prior art U.S. Pat. No. 3,897,648, issued Aug. 5, 1975, entitled "Diving Plane for Fishing Vessel," I disclose an improved diving plane for fishing.

SUMMARY OF THE INVENTION

A diving apparatus is placed in serial connection in a fish line proximate to the trailing and submerged end of the line as the line is used in trolling. The apparatus includes a planar diving platform constructed with a transverse base area at the leading end of the platform having trailing and projecting flukes spaced to form a longitudinally extending and rearwardly opening central slot. A keel is fastened normally to the plane of the platform and depends forwardly of the slot to define a sinker holding surface on which paired, substantially hemispherical weights are fastened on either side thereof. Two normally depending and projecting fins extend normally down from the planar surface of the platform immediately juxtaposed to both sides of the slot. The release member has one portion connected to the leading end of the fish line and a second member connected to the trailing edge of the fish line. This release member clamps medially at an intermediate catch member to a bar spanning the slot and is held by the projecting fins in rigid, side-by-side relation to form an effectively rigid, three-dimensional locked and clamped position. When the platform is being pulled through the water in trolling, it dives and trolls in essentially a vertical plane including the path of the trailing line, this vertical plane being in the wake of towing of the line. Entanglement with adjoining, closely spaced trolling lines is avoided. Provision is made for conventional release from the three-dimensional diving position on occurrence of a strike.

OTHER OBJECTS AND ADVANTAGES OF THE INVENTION

An object of this invention is to disclose a diving plane for fishing which will dive in a substantially vertical plane with respect to a trailing and towed trolling line. Over my prior art U.S. patent, I have added an improved keel and trailing fins. The trailing fins are disposed to brace rigidly there between the release mechanism to hold the towing point of the non-released platform in a rigid, three-dimensional spaced relation from the platform.

An advantage of this invention is that the diving platform can now be used in a multiple line boat, especially a party boat having numerous amateur fishermen assigned relatively closely spaced stations. This effect is believed due to clamping the release mechanism and projecting fins maintaining the platform in fixed angular relationship to the towing trolling line. The bait or lure end of the line has transverse stability imparted to its towed path to prevent entanglement of adjoining and closely spaced lines.

A further advantage of this invention is that the keel and fins, as formed to and normally depending from the platform, reinforce the planar rigidity of the platform with a beam-like action. The tendency of the platform to bend or distort in towing movement and resultant instability due to bending or distortion of the platform is reduced.

A further advantage of the disclosed diving platform is that the hydraulic effect on the platform produces the desired diving. Differing sizes of trailing bait or lures do not substantially effect the performance of the platform. Instead, the platform dives each time to a depth which is a function of the length of line let out and not the size of bait or lure towed by the platform.

A further advantage of the disclosed diving sinker is that it has the conventional advantage of my prior art diving platform—it is recoverable when a strike occurs and can be reused many times without loss of weights. Upon occurrence of a strike, platform and line surfacing results.

A further advantage of this invention is that upon the struggling movement of a hooked fish, the released platform easily tracks the line. The platform and weight do not unnecessarily surcharge recovery of the line and fish.

DESCRIPTION OF THE DRAWINGS

FIG. 1 is a perspective view showing the sinker release connected to the platform in a diving situation;

FIG. 2 is a side elevation diagramatically showing the interrelationship of the trolling vessel during a diving trolling condition;

FIG. 3 is a diagramatic view similar to FIG. 2 in which the diving platform is out of the diving condition due to line tension caused at the release mechanism by the strike of a fish; and, FIG. 4 is a bottom perspective view of the platform illustrating the improved fins and keel of this diving platform.

DETAILED DESCRIPTION OF THE DRAWINGS

With reference to all the figures, the apparatus of this invention includes a planar diving platform 15. The platform has a base portion 16 and a pair of projecting flukes 17, 18. The flukes are spaced apart from the base portion 16 to define a longitudinally trailing and rearwardly opening slot 20 in the platform. Preferably, the flukes taper at boundaries 21, 22 at an approximate 15° angle from the side edges of the platform to provide a decreasing trailing area to the platform. This decreasing area tapers away from base 16 to the end of the flukes.

The platform includes three depending members. First, there is a depending keel member 25. Keel member 25 fastens to base member 16 in longitudinal alignment with slot 20. Keel member 25 fastens to the base 16 ahead of the slot and depends downwardly and forwardly terminating in a rounded, lower boundary 27. Paired semi-hemispherical lead weights 30 are clamped across keel member 25 at an aperture 31 and are typically held in this position by a rivet (not shown).

Paired fins 35, 36 extend normally down from the platform 15 on either side of the slot 20. Fins 35, 36 are juxtaposed to the side edges of the slot so that they form a smooth and uninterrupted planar surface commencing with the boundaries of the slot and extending downwardly to and between their confronted surfaces. Like flukes 17, 18, fins 35, 36 taper rearwardly at borders 37 to present decreased surface area at the trailing end of the flukes.

Integrally formed and embedded within the platform 15 and fins 35, 36 of the invention is a horizontal cross bar 40. Cross bar 40 is grasped by the release member 42 which is utilized when the platform 16 is towed through the water. Cross bar 40 and release member 42 together form a coacting catch member that releases upon the occurrence of a strike.

Release member 42 is a standard item of commerce. Specifically, it incorporates a tubular housing 47 closed at both ends and having connected to the forward end 49 a connector 48. The trailing end 51 is apertured at 52 through which a Cotter key shaft 55 is reciprocally mounted for sliding movement relative to the aperture. The Cotter key shaft 55 is bent to form a stop 58 against which a spring 59 is compressed. The midsection of the housing 42 is cut to form a cutout 60 through which Cotter key shaft 55 is arranged to form a releasable lock for engagement at cross bar 40. It can thus be seen that a tensile force through the release member 42 between its ends will affect release of the bar 40.

In operation, a fish line 71 is connected to the leading end of release member 42 at connector 31 and tackle including leader 72 and hook 73 is connected to the trailing end of release member 42 at connector 66. Cotter key shaft 55 is manually withdrawn against spring 59. The release member 42 is then inserted through the slot 20 and aligned so that upon release of shaft 55, shaft 40 is captured. A longitudinal platform clamp or connecting member 79 with loops at both ends passes through an aperture 80 at enlarged loop 81 and serially connects swivel 31 to connector 48 at a loop 82.

With reference to FIGS. 1 and 2, it will be seen that the platform is maintained with swivel 31 pivoting at a relatively rigid and firmly spaced, three-dimensional relationship relative to the platform 15. Specifically, the confronting faces of depending fins 35, 36 clamp and prevent side-to-side movement of the release member 42. At the same time, release member 42 clamps and holds the platform at bar 40. Member 79 rigidly holds connector 48 at a relatively fixed angular relation to the surface of platform 15. Member 79 and release member 42 between its leading end and the catch member form a towing bridle for the platform.

The platform is then pulled through the water, typically by a boat 90. As boat 90 progresses through the water, hydraulic pressure against the upper surface of the plane 15 causes the device to dive. Weight of the keel 25 maintains the upright orientation so that the angular relationship shown in FIG. 2 is maintained. As has heretofore been previously explained at length, the apparatus vertically dives and trails the vessel 90 in a vertical plane which includes the trailing path of the line.

It can be seen that as the device gets down to a predetermined depth with a predetermined length of line, the angle of the diving plane 15 will flatten to the point where further diving is resisted. Thus, the device finds a depth which is determined by the length of the line 71 from the towing vessel. Relatively precise prediction and repetition of trolling depth is possible.

When a fish 94 takes the hook 73, pressure is applied to Cotter key 45 to overcome the spring pressure 49 and thereby releases bar 40. Under these circumstances, plane 15 then falls free of the line. Plane 15 offers no diving action and is simply free to trail with the lines so that a fish can be played without the encumbrance of diving action. It is important to note that the release mechanism is not under substantial pressure while the hook 73 is in the normal towed position. The diving forces on the platform are all transmitted through member 79 and bar 40 to enable the line to dive to the predetermined depth. It is only when a fish releases the platform that normal trailing action of the line occurs.

It is emphasized that the particular configurations herein disclosed have been determined after much experimentation. The disclosed device especially with its keel and confronted fins across the slot has the property of tracking and diving in a vertical plane from the towed vessel 90 and is particularly suitable for use from vessels having multiple towed and trolling lines.

I claim:

1. In diving apparatus useful for fishing including a release member serially connectable to a towed fishing line, said release member having a first end connected to the leading end of said line, a second end connected to the trailing end of said line, a first catch member therebetween for opening from a closed position upon a predetermined amount of tension in said release member between said ends, and a central portion of predetermined transverse dimension adjacent said first catch member, a planar diving platform being formed with a leading base area, first and second trailing flukes separated to define first and second edges of a slot rearwardly extending from the leading base member; a connector having a first end mounted to said platform at said base and a second end mounted to the first end of said release member to permanently attach said platform to said first end of said release member; a second catch member spanning said slot for maintaining said release member at said first catch member within said slot to releasably attach said release member to said platform whereby said platform and release member between said first end and said first catch member together form a towing bridle on one side of said platform for pulling said platform through water at a preselected and constant diving angle, the improvement comprising: first and second fin members formed from and supported on said first and second flukes respectively at said slot extending normally to the planar platform; wherein said first and second fins are juxtaposed to the first and second side edges of said slot to form first and second uninterrupted planar surfaces defining a channel of a width generally that of the predetermined transverse dimension of said release members; said fins allowing said release member to slide into and out of said channel along said slot, but preventing said release member from undergoing side-to-side rotation and translation relative to said diving platform; said fins further inhibiting side-to-side movement of said diving platform relative to said water; such that said release member is held with respect to said connector to form a three-dimensional spaced towing bridle for said platform whereby said platform dives in a substantially vertical plane.

2. The invention of claim 1 and including a keel member mounted to said platform at said base, said keel member being longitudinally aligned to said slot and protruding away from said platform on the other side of said platform.

3. The diving platform of claim 1 and wherein said fin members protrude normally away from said platform on the other side of said platform.